United States Patent [19]

Sakano

[11] Patent Number: 4,908,716
[45] Date of Patent: Mar. 13, 1990

[54] IMAGE PROCESSING APPARATUS
[75] Inventor: Yukio Sakano, Fuchu, Japan
[73] Assignee: Ricoh Company, Ltd., Japan
[21] Appl. No.: 280,952
[22] Filed: Dec. 7, 1988
[30] Foreign Application Priority Data Dec. 8, 1987 [JP] Japan .................. 62-308684
Feb. 29, 1988 [JP] Japan .................. 63-47098

[51] Int. Cl.$^4$ .............................................. H04M 1/40
[52] U.S. Cl. ..................................... 358/453; 358/462
[58] Field of Search ............... 358/453, 448, 452, 450, 358/462; 382/9, 48

[56] References Cited

U.S. PATENT DOCUMENTS

| | | | |
|---|---|---|---|
| 4,257,044 | 3/1981 | Fukuoka | 358/453 |
| 4,558,374 | 12/1985 | Kurata et al. | 358/453 |
| 4,760,463 | 7/1988 | Nonoyama et al. | 358/453 |
| 4,823,395 | 4/1989 | Chikauchi | 358/48 |
| 4,837,635 | 6/1989 | Santos | 358/453 |

FOREIGN PATENT DOCUMENTS

| | | |
|---|---|---|
| 3615906 | 11/1986 | Fed. Rep. of Germany . |
| 3621046 | 1/1987 | Fed. Rep. of Germany . |
| 33333 | 8/1985 | Japan . |
| 159570 | 7/1987 | Japan . |

Primary Examiner—Edward L. Coles, Sr.
Attorney, Agent, or Firm—Mason, Fenwick & Lawrence

[57] ABSTRACT

An image processing apparatus has editing modes in which an arbitrary image portion in an arbitrary area of a document image is extracted and outputted as a processed image, which editing modes include at least a trimming mode and a masking mode. The image processing apparatus has an input terminal for receiving an image signal describing a document image including a marking which designates a desired image portion to be trimmed or masked by at least encircling an area of the document image, a first circuit coupled to the input terminal for generating a first signal indicating a marked area which is encircled by the marking and excludes the marking, a second circuit coupled to the input terminal for generating a second signal indicating a marked area which is encircled by the marking and includes the marking, and a selector part coupled to the input terminal for selectively outputting one of a binary image signal derived from the image signal and a predetermined reference signal responsive to the first and second signals in the editing mode, thereby outputting a binary processed image signal describing a processed image in which the desired image portion is trimmed or masked at the marked area.

10 Claims, 2 Drawing Sheets

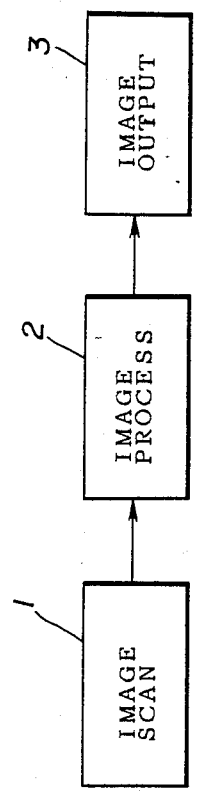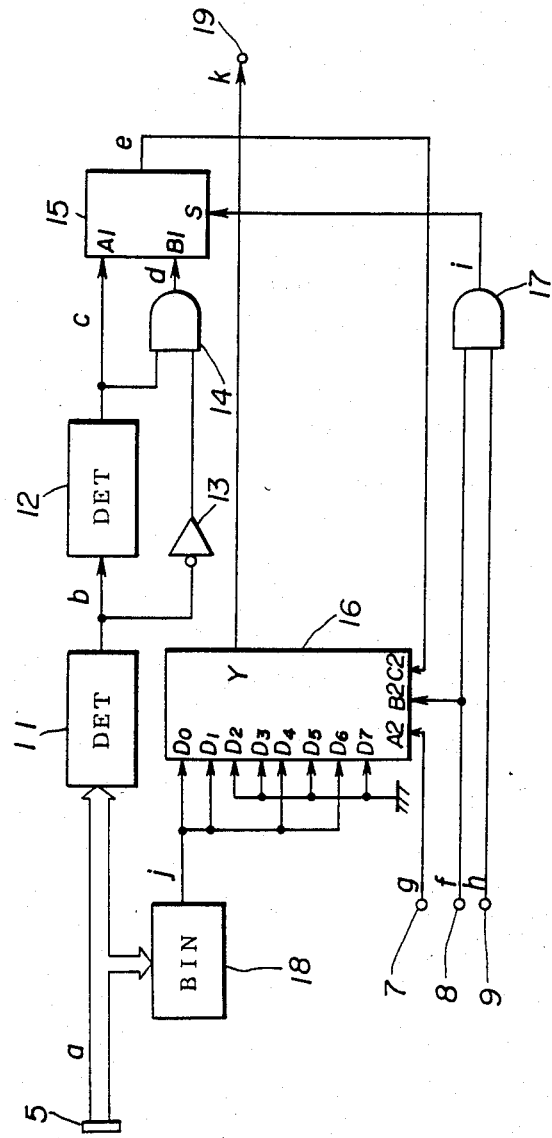

IMAGE PROCESSING APPARATUS

BACKGROUND OF THE INVENTION

The present invention generally relates to image processing apparatuses, and more particularly to an image processing apparatus in which an area of a document is designated by a marking entered in the document and a portion encircled by the marking is treated as a marked area which is the subject of a trimming or a masking process.

There are strong demands for image processing apparatuses having an editing function such as trimming and masking. For example, there are demands for a copying machine which makes copy prints by extracting only a desired region of a document or masking (erasing) the desired region of the document. There are also demands for a facsimile machine which transmits an image of only a desired region of the document. In such kinds of image processing apparatuses, a detection of the desired region which is designated plays a most important role of the image processing.

In a trimming mode, a trimming of a predetermined region of a document image means that only an image portion corresponding to the predetermined region is extracted from the entire document image. On the other hand, in a masking mode, a masking of the predetermined region of the document image means that the image portion corresponding to the predetermined region is masked and only an image portion other than the image portion corresponding to the predetermined region is extracted from the entire document image.

Conventionally, in these kinds of image processing apparatuses, the desired region of the document is generally designated by one of following first and second methods. According to the first method, the desired region is designated from ten-keys of an operation part by entering coordinates of the desired region. On the other hand, according to the second method, the document is once read into and displayed on a CRT display device and the desired region is designated by moving a cursor, a light pen, a mouse and the like while monitoring the document image.

According to the first method, the operation of reading the coordinates of the desired region of the document and the operation of entering the coordinates from the ten-keys of the operation part are troublesome to perform. In addition, the desired region which can be designated is substantially limited to a region having a simple shape such as a rectangular region.

On the other hand, according to the second method, the image processing apparatus becomes complex, bulky and expensive. Furthermore, it is impossible to carry out the image processing in real time, thus making the apparatus unsuited for use in a copying machine, a facsimile machine and the like which are generally used in offices.

In order to reduce the problems of the above described methods, an apparatus was proposed in a Japanese Published Patent Application No. 60-33333. According to this proposed apparatus, the desired region of the document is detected from an L-shaped indication of a predetermined color entered on the document. Hence, it is possible to designate the desired region of the document when the L-shaped indication of the predetermined color is entered on the document to indicate the desired region. However, because the L-shaped indication uses two adjacent sides of a rectangle, the shape of the region which can be designated is inevitably limited to a rectangle. In addition, it is inconvenient that a color discriminating means is required to detect the L-shaped indication of the predetermined color.

In view of the above described background of the art, an apparatus was previously proposed in a Japanese Laid-Open Patent Application No. 62-159570 in which the applicant is the same as the assignee of the present application. According to the previously proposed apparatus, the desired region of the document is encircled by a marking made with a color felt pen and the like having a tone which falls within a predetermined tone range. When the document having such a marked region is read, the marked region is detected as the desired region of the document. In this case, the marked region including the marking is subjected to the image processing such as the trimming and masking. For this reason, when the marking is made with a pen of a relatively high tone, there is a problem in that the marking itself is thinly copied in the case where the image processing apparatus is applied to the copying machine. In the case where the image processing apparatus is applied to the facsimile machine, the marking itself thinly appears on a print which is outputted from a receiving facsimile machine. In other words, the marking itself appears in a processed image which is derived from the document image.

SUMMARY OF THE INVENTION

Accordingly, it is a general object of the present invention to provide a novel and useful image processing apparatus in which the problems described above are eliminated.

Another and more specific object of the present invention is to provide an image processing apparatus which prevents a marking for designating a desired region of a document from appearing in a processed image derived from the document image.

Still another object of the present invention is to provide an image processing apparatus having editing modes in which an arbitrary image portion in an arbitrary area of a document image is extracted and outputted as a processed image, which editing modes include at least a trimming mode and a masking mode. The image processing apparatus comprises input terminal means for receiving an image signal describing a document image including a marking which designates a desired image portion to be trimmed or masked by at least encircling an area of the document image, first means coupled to the input terminal means for generating a first signal indicating a marked area which is encircled by the marking and excludes the marking, second means coupled to the input terminal means for generating a second signal indicating a marked area which is encircled by the marking and includes the marking, and selector means coupled to the input terminal means for selectively outputting one of a binary image signal derived from the image signal and a predetermined reference signal responsive to the first and second signals in the editing mode, thereby outputting a binary processed image signal describing a processed image in which the desired image portion is trimmed or masked at the marked area. According to the image processing apparatus of the present invention, it is possible to arbitrarily select whether or not the marking itself is to be included in the marked area during the editing mode. For this reason, it is possible to prevent the marking from appearing in the processed image derived from the document image when required.

Other objects and further features of the present invention will be apparent from the following detailed description when read in conjunction with the accompanying drawings.

BRIEF DESCRIPTION OF THE DRAWINGS

FIG. 1 is a system block diagram showing a general construction of an image forming apparatus which may be applied with an image processing apparatus according to the present invention;

FIG. 2 is a system block diagram showing an embodiment of an image processing apparatus according to the present invention;

DETAILED DESCRIPTION

Figure 3:
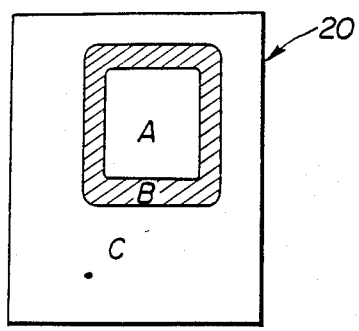
FIG. 3 shows an example of an input image of a document (document image)

FIG. 1 shows a general construction of an image forming apparatus which may be applied with an image processing apparatus according to the present invention. The image forming apparatus has an image scanner 1, an image processing part 2 and an image output part 3. The image scanner 1 optically scans and reads an image of a document and supplies an image signal of the document image to the image processing part 2. The image processing part 2 subjects the image signal to a predetermined image processing and outputs an image signal which describes a processed image. The processed image is outputted from the image output part 3. The image output part 3 may be constituted by an image forming means which forms an image on a paper or the like by electrophotography or displays the image on a display means. For convenience sake, it is assumed hereunder that the image forming apparatus is a copying machine and the image output part 3 forms the image by electrophotography.

FIG. 2 shows an essential part of an embodiment of an image processing apparatus according to the present invention. The block system shown in FIG. 2 substantially corresponds to the image processing part 2 of the image forming apparatus shown in FIG. 1. The image processing apparatus has a mark detecting circuit 11, a marked area detecting circuit 12, an inverter 13, AND circuits 14 and 17, selectors 15 and 16 and a binarization circuit 18.

An image signal (image data) a applied to input terminal means 5 is a 6-bit signal which describes an input image in 64 gradation levels. The mark detecting circuit 11 is supplied with the image signal a and detects a marking in the input image. For example, the marking is entered on the document by use of a color felt pen having a tone which falls within a predetermined tone range, and the marking encircles a desired area of the document. Hence, the mark detecting circuit 11 can detect the marking by detecting the tone of the image. A mark signal b outputted from the mark detecting circuit 11 and indicating the detected marking is supplied to the marked area detecting circuit 12. The marked area detecting circuit 12 detects a marked area which is encircled by the marking in the input image and outputs a marked area signal c indicating the marked area. The marked area signal c is supplied to a control terminal A1 of the selector 15.

The inverter 13 is supplied with the mark signal b and supplies an inverted signal $\bar{b}$ to the AND circuit 14. The AND circuit 14 also receives the marked area signal c, and outputs a signal d which indicates the marked area excluding the marking itself. This signal d is supplied to a control terminal B1 of the selector 15.

The selector 15 selectively outputs one of the signals applied to the control terminals A1 and B1 thereof responsive to a signal i which is supplied to a set terminal S thereof. This signal i is outputted from the AND circuit 17 and an output signal e of the selector 15 is the signal d when the signal i has a high level and is the signal c when the signal i has a low level.

The selector 16 receives a binary image signal (image data) j from the binarization circuit 18 at input terminals D0, D1, D4 and D6 thereof. The binary image signal j has a high level at a black portion of the input image and a low level at a white portion of the input image, for example, and is derived from the image signal a received at the input terminal means 5. Input terminals D2, D3, D5 and D7 of the selector 16 are grounded. A signal g from an input terminal 7 is applied to a control terminal A2 and a signal f from an input terminal 8 is applied to a control terminal B2 of the selector 16. In addition, the signal e from the selector 15 is applied to a control terminal C2 of the selector 16. An output image signal k which is outputted from an output terminal Y of the selector 16 and obtained through an output terminal 19 is determined by the input conditions at the control terminals A2, B2 and C2 of the selector 16.

The following Table 1 shows the signal at the output terminal Y of the selector 16 determined by the signal levels at the control terminals A2, B2 and C2, where "0" and "1" respectively denote low and high levels of signals, and D0 through D7 denote signals at the input terminals D0 through D7 of the selector 16.

TABLE 1

| C2 | B2 | A2 | Y |
|---|---|---|---|
| 0 | 0 | 0 | D0 (j) |
| 0 | 0 | 1 | D1 (j) |
| 0 | 1 | 0 | D2 (0) |
| 0 | 1 | 1 | D3 (0) |
| 1 | 0 | 0 | D4 (j) |
| 1 | 0 | 1 | D5 (0) |
| 1 | 1 | 0 | D6 (j) |
| 1 | 1 | 1 | D7 (0) |

The signal f applied to the input terminal 8 has a high level in a trimming mode, while the signal g applied to the input terminal 7 has a high level in a masking mode. The signal h applied to the input terminal 9 indicates whether or not to include the marking itself in the marked area regardless of whether the trimming mode or the masking mode is selected. For example, the signal h is outputted from a selection switch (not shown) provided in an operation part (not shown) of the image processing apparatus. The signal h has a high level when the marking itself is to be excluded in marked area during the trimming mode and has a low level when the marking itself is to be included in the marked area during the trimming and masking modes.

The signal f from the input terminal 8 and the signal h from the input terminal 9 are also supplied to the AND circuit 17, and the AND circuit 17 produces the signal i based on these two signals f and h.

The signals f and g are also outputted from the operation part. For example, when the trimming mode is selected by manipulating a trimming key (not shown) of the operation part, a high-level signal f is outputted from the operation part. In addition, a high-level signal g is outputted from the operation part when the masking mode is selected by manipulating a masking key (not shown) of the operation part. Of course, when the trimming mode is newly selected during the masking mode, the masking mode is automatically reset without the need to turn OFF the masking key. Similarly, when the masking mode is selected during the trimming mode, the trimming mode is automatically reset without the need to turn OFF the trimming key.

FIG. 3 shows an example of the input image of a document, that is, a document image. A document image 20 has areas A, B and C. The mark area B indicated by a hatching encircles the area A, while the area C exists outside the mark area B. In FIG. 3, the characters A, B and C also denote an image (black image) within the respective areas A, B and C.

The following Table 2 shows the image signal k outputted from the output terminal 19 in the areas A, B and C during a normal mode, the trimming mode and the masking mode when the signal h has the high level. The value "j" indicates the black image portion while the value "0" indicates the white image portion.

TABLE 2

| Mode/Area | A | B | C |
| --- | --- | --- | --- |
| Normal | j | j | j |
| Trimming | j | 0 | 0 |
| Masking | 0 | 0 | j |

Therefore, when the signal h has the high level, the image within the mark area B, that is, the mark area B itself is forcibly converted into a white image portion during the trimming and masking modes as may be seen from the Table 2 because k=0 within the mark area B. As a result, only the image portion within the area A remains in the processed image which is finally outputted from the output terminal 19.

The following Table 3 shows the image signal k outputted from the output terminal 19 in the areas A, B and C during the normal mode, the trimming mode and the masking mode when the signal h has the low level.

TABLE 3

| Mode/Area | A | B | C |
| --- | --- | --- | --- |
| Normal | j | j | j |
| Trimming | j | j | 0 |
| Masking | 0 | 0 | j |

Accordingly, when the signal h has the low level, the image within the mark area B, that is, the mark area B itself may partially appear as a black image portion during the trimming mode as may be seen from the Table 3 because k=j within the mark area B, especially when the marking is dark (that is, the tone of the marking is high) and a portion of the marking is recognized as being a black portion when a corresponding image data portion is subjected to the binarization in the binarization circuit 18 to obtain the binary image signal j. But when the marking is not so dark that a portion of the marking is recognized as being a black portion, it is in some cases more convenient to set the level of the signal h to the low level, such as the case where a desired area of the document is relatively small and more easily designated by entering the marking over the entire desired area rather than encircling the desired region by the marking.

In this embodiment, the selectors 15 and 16 are controlled so as to select a mode in which the marking itself is included in the marked area and a mode in which the marking itself is excluded from the marked area at the AND circuit 17 which receives the signal h from the input terminal 9.

In FIG. 2, time delays occur at the mark detecting circuit 11, the mark area detecting circuit 12 and the binarization circuit 18. Hence, appropriate time compensations are carried out in these circuits to compensate for such time delays. Means for carrying out such time compensations are known and an illustration and description thereof will be omitted in the present application.

Hence, in this embodiment, when the marking is relatively dark (that is, the tone is relatively high) and there is a possibility that the marking itself will partially appear on the processed image during the trimming mode, the selection switch of the operation part can manipulated so as to switch the level of the signal h to the high level so as to set the marked area excluding the marking itself as a trimming area. In addition, it is possible to set the marked area excluding the marking itself as the trimming area during the trimming mode and to set the mark area including the marking itself as the masking area during the masking mode.

FIGS. 4 through 8 show processed images outputted from the embodiment of the image processing apparatus shown in FIG. 2 in various modes.

Figure 4:
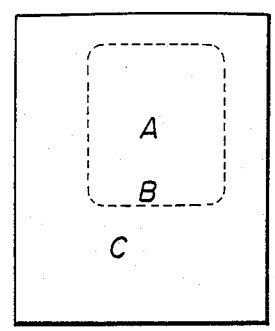
FIGS. 4 through 8 show processed images outputted from the embodiment of the image processing apparatus in various modes.

FIG. 4 shows the processed image obtained in the normal mode shown in the Tables 2 and 3. In this case, the signals f and g have low levels, and the signal h may have a low or high level. The marking itself thinly appears as indicated by a phantom line in addition to the images A, B and C in the respective areas A, B and C.

Figure 5:
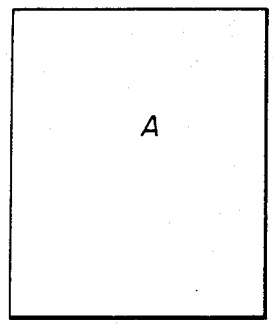

FIG. 5 shows the processed image obtained in the trimming mode shown in the Table 2. In this case, the signals f and h have high levels, and the signal g has a low level. Since the marking itself is not included in the trimming area, the image B and the marking itself do not appear in the processed image and only the image A within the area A appears in the processed image.

Figure 6:
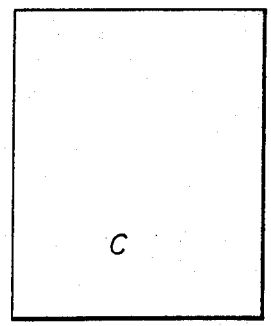

FIG. 6 shows the processed image obtained in the masking mode shown in the Table 2. In this case, the signal f has a low level and the signals g and h have high levels. Because the marking itself is included in the masking area, the image A, the image B and the marking itself are masked and do not appear in the processed image, and only the image C within the area C appears in the processed image.

Figure 7:
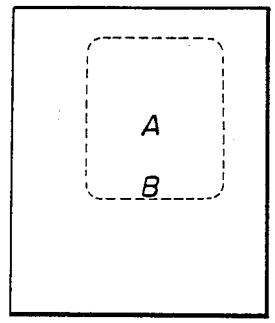

FIG. 7 shows the processed image obtained in the trimming mode shown in the Table 3. In this case, the signal f has a high level and the signals g and h have low levels. Since the marking itself is included in the trimming area, the image B and the marking itself appear in the processed image together with the image A within the area A.

Figure 8:
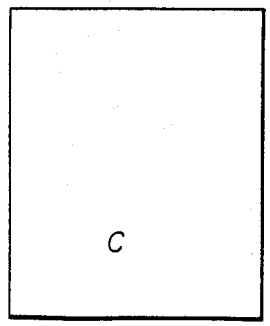

FIG. 8 shows the processed image obtained in the masking mode shown in the Table 3. In this case, the signals f and h have low levels and the signal g has a high level. Because the marking itself is included in the masking area, the image A, the image B and the marking itself are masked and do not appear in the processed image, and only the image C within the area C appears in the processed image.

Although the embodiment is described for the case where the present invention is applied to the image forming apparatus or copying machine, it is possible to apply the present invention to other apparatuses including the facsimile machine. In the case of the facsimile machine, for example, the processed image data outputted from the image processing part 2 shown in FIG. 1 is obtained from a caller facsimile machine and the processed image outputted from the image output part 3 is obtained from a receiving facsimile machine which receives the processed image data through a transmission path.

In addition, according to the present invention, it is possible to designate a desired area of a document with ease with a large degree of freedom in that the shape of the desired area is not limited to a rectangle. In other words, it is possible to designate the desired area by simply encircling or filling the desired area by use of a felt pen or the like having the tone which falls within the predetermined tone range.

Further, the present invention is not limited to these embodiments, but various variations and modifications may be made without departing from the scope of the present invention.

What is claimed is

1. An image processing apparatus having editing modes in which an arbitrary image portion in an arbitrary area of a document image is extracted and outputted as a processed image, said editing modes including at least a trimming mode and a masking mode, said image processing apparatus comprising:
    input terminal means for receiving an image signal describing a document image, said document image including a marking which designates a desired image portion to be trimmed or masked by at least encircling an area of the document image;
    first means coupled to said input terminal means for generating a first signal indicating a marked area which is encircled by said marking and excludes said marking;
    second means coupled to said input terminal means for generating a second signal indicating a marked area which is encircled by said marking and includes said marking; and
    selector means coupled to said input terminal means for selectively outputting one of a binary image signal derived from the image signal and a predetermined reference signal responsive to said first and second signals in the editing mode, thereby outputting a binary processed image signal describing a processed image in which said desired image portion is trimmed or masked at the marked area.

2. An image processing apparatus as claimed in claim 1 in which said selector means outputs a binary processed image signal describing a processed image in which said desired image portion is trimmed or masked at the marked area excluding said marking in the trimming and masking modes.

3. An image processing apparatus as claimed in claim 1 in which said selector means outputs a binary processed image signal describing a processed image in which said desired image portion is trimmed or masked at the marked area including said marking in a normal mode in which no editing takes place.

4. An image processing apparatus as claimed in claim 1 in which said selector means outputs a binary processed image signal describing a processed image in which said desired image portion is trimmed at the marked area excluding said marking in the trimming mode and describing a processed image in which said desired image portion is masked at the marked area including said marking in the masking mode.

5. An image processing apparatus as claimed in claim 1 which further comprises input terminals for receiving first control signals for determining whether said desired image portion to be trimmed or masked at the marked area is to include or exclude said mask, said first control signals being supplied to said selector means.

6. An image processing apparatus as claimed in claim 5 in which said selector means includes means for generating a second control signal from said first control signals and a first selector for selectively outputting one of said first and second signals responsive to said second control signal, said selector means selectively outputting one of the binary image signal derived from the image signal and the predetermined reference signal based on said first control signals and an output signal of said first selector in the editing mode.

7. An image processing apparatus as claimed in claim 6 in which said selector means further includes a binarization circuit supplied with the image signal from said input terminal means for outputting the binary image signal derived from the image signal, and a second selector supplied with the binary image signal from said binarization circuit, said first control signals and the output signal of said first selector, said binary processed image signal being outputted from said second selector.

8. An image processing apparatus as claimed in claim 1 in which said predetermined reference signal describes a white image portion of the processed image.

9. An image processing apparatus as claimed in claim 1 in which said marking which designates the desired image portion to be trimmed or masked by at least encircling an area of the document image is marked over the document image with a tone which falls within a predetermined tone range.

10. An image processing apparatus as claimed in claim 9 in which said marking is made by a felt pen having the tone which falls within said predetermined tone range.

* * * * *